US012804198B2

(12) United States Patent
Gao

(10) Patent No.: US 12,804,198 B2
(45) Date of Patent: Nov. 17, 2026

(54) METHOD AND APPARATUS OF ENCODING/DECODING POINT CLOUD GEOMETRY DATA

(71) Applicant: BEIJING XIAOMI MOBILE SOFTWARE CO., LTD., Beijing (CN)

(72) Inventor: Shuo Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 85 days.

(21) Appl. No.: 18/725,061

(22) PCT Filed: Dec. 30, 2021

(86) PCT No.: PCT/CN2021/143296
§ 371 (c)(1),
(2) Date: Jun. 27, 2024

(87) PCT Pub. No.: WO2023/123261
PCT Pub. Date: Jul. 6, 2023

(65) Prior Publication Data
US 2025/0071325 A1 Feb. 27, 2025

(51) Int. Cl.
*H04N 19/597* (2014.01)
*H04N 19/91* (2014.01)

(52) U.S. Cl.
CPC ........... *H04N 19/597* (2014.11); *H04N 19/91* (2014.11)

(58) Field of Classification Search
None
See application file for complete search history.

(56) References Cited

U.S. PATENT DOCUMENTS

2021/0312670 A1 10/2021 Mammou et al.
2022/0207780 A1 * 6/2022 Ramasubramonian ...................... H04N 19/172
2023/0105931 A1 * 4/2023 Van der Auwera ..... G06T 9/001 382/232

OTHER PUBLICATIONS

PCT/CN2021/143296 International Search Report dated Jun. 24, 2022, 3 ages.
Lasserre S et al: "[GPCC-EE13.53] Algorithmic explanation of the new Lidar Codec LL-LC2", No. m57073, Jun. 10, 2021, 37 pages.

* cited by examiner

*Primary Examiner* — Christopher Braniff
(74) *Attorney, Agent, or Firm* — Cozen O'Connor

(57) ABSTRACT

A method of encoding a point cloud into a bitstream of encoded point cloud data, each point of the point cloud being associated with a radius responsive to a distance of the point from a sensor that captured the point. The method includes: obtaining a predicted radius representative of a prediction of a radius of a point of the point cloud from prediction data (PD); obtaining a residual radius of a point of the point cloud between the radius of said point and the predicted radius; selecting a context based on the prediction data (PD); and context-based entropy encoding the magnitude of the residual radius based the selected context.

20 Claims, 8 Drawing Sheets

METHOD AND APPARATUS OF ENCODING/DECODING POINT CLOUD GEOMETRY DATA

CROSS REFERENCE TO RELATED APPLICATION

This application is a national phase application based on International Application No. PCT/CN2021/143296, filed Dec. 30, 2021, the entire content of which is incorporated by reference for all purposes.

FIELD

The present application generally relates to point cloud compression and, in particular to methods and apparatus of encoding/decoding point cloud geometry data into a bitstream.

BACKGROUND

The present section is intended to introduce the reader to various aspects of art, which may be related to various aspects of at least one exemplary embodiments of the present application that is described and/or claimed below. This discussion is believed to be helpful in providing the reader with background information to facilitate a better understanding of the various aspects of the present application.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge. Another use case is in topography and cartography in which using 3D representations allows for maps that are not limited to the plane and may include the relief.

SUMMARY

According to a first aspect of the present application, there is provided a method of encoding a point cloud into a bitstream of encoded point cloud data, each point of the point cloud being associated with a radius responsive to a distance of the point from a sensor that captured the point, the method comprising:

- obtaining a predicted radius representative of a prediction of a radius of a point of the point cloud from prediction data (PD);
- obtaining a radius residual of a point of the point cloud between the radius of said point and the predicted radius;
- selecting a context based on the prediction data (PD); and
- context-based entropy encoding the magnitude of the radius residual based the selected context.

According to a second aspect of the present application, there is provided a method of decoding a point cloud from a bitstream of encoded point cloud data, each point of the point cloud being associated with a radius responsive to a distance of the point from a sensor that captured the point, the method comprising:

- obtaining a predicted radius representative of a prediction of a radius of a point of the point cloud from prediction data (PD);
- selecting a context based on the prediction data (PD); and
- context-based entropy decoding the magnitude of the radius residual based the selected context.

According to a third aspect of the present application, there is provided an apparatus comprising one or more processors configured to carry out a method of encoding a point cloud into a bitstream of encoded point cloud data, each point of the point cloud being associated with a radius responsive to a distance of the point from a sensor that captured the point, the method comprising:

- obtaining a predicted radius representative of a prediction of a radius of a point of the point cloud from prediction data (PD);
- obtaining a radius residual of a point of the point cloud between the radius of said point and the predicted radius;
- selecting a context based on the prediction data (PD); and
- context-based entropy encoding the magnitude of the radius residual based the selected context.

BRIEF DESCRIPTION OF THE DRAWINGS

Reference will now be made, by way of example, to the accompanying drawings which show exemplary embodiments of the present application, and in which.

Similar reference numerals may have been used in different figures to denote similar components.

DESCRIPTION OF EXEMPLARY EMBODIMENTS

Figure 1:
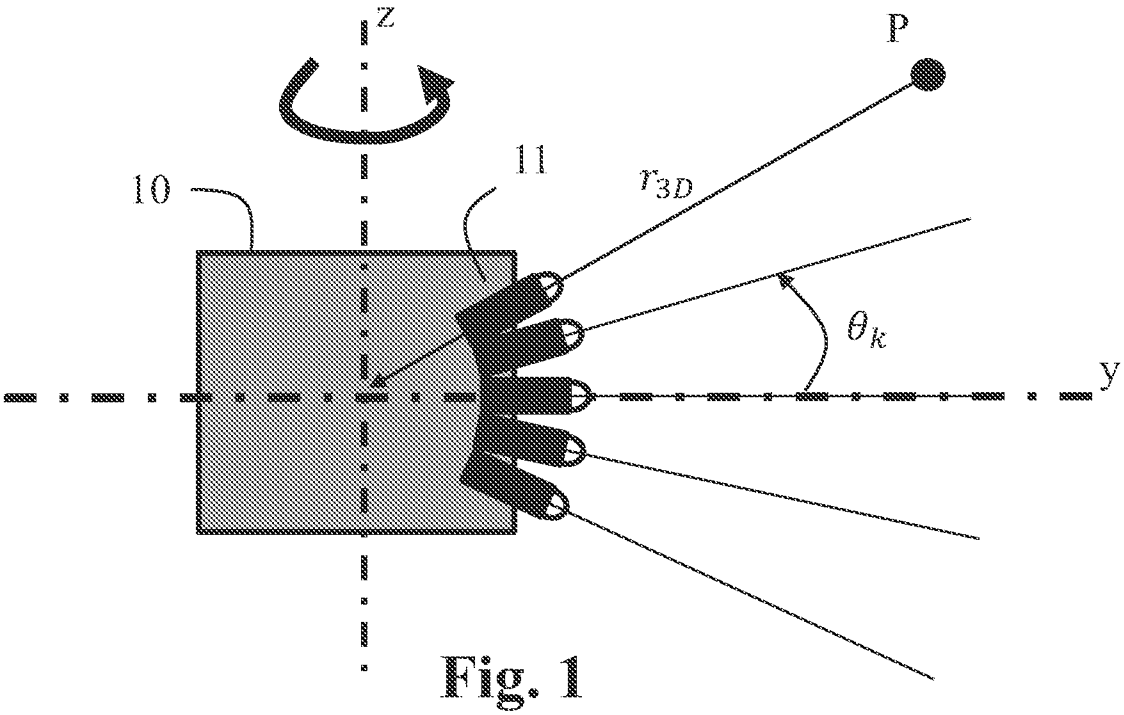
FIG. 1 shows a side view of a sensors head and some of its parameters in accordance with prior art.

At least one of the exemplary embodiments is described more fully hereinafter with reference to the accompanying figures, in which examples of at least one of the exemplary embodiments are illustrated. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to “probe” their environment to make good driving decisions based on the detected presence and nature of their immediate nearby objects and road configuration.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x, y and z) and attributes.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely MPEG-I part 5 (ISO/IEC 23090-5) or Video-based Point Cloud Compression (V-PCC)

MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data captured by a spinning sensor head, e.g. a spinning Lidar head, mounted on a moving vehicle. This usually requires a simple and low-latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to sparse geometry data captured by a spinning sensor head have been already exploited to get very efficient encoding/decoding methods.

Figure 2:
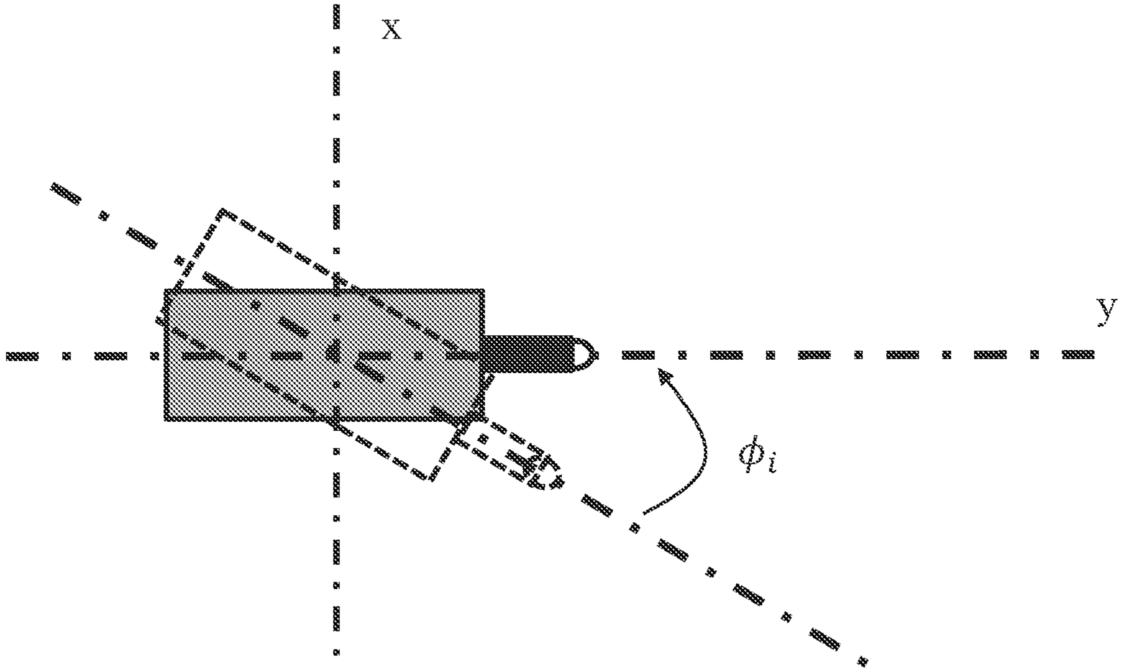
FIG. 2 shows a top view of the sensors head and some of its parameters in accordance with prior art.

For example, G-PCC exploits the elevation angle (relative to the horizontal ground) of capture from a spinning sensor head as depicted on FIGS. 1 and 2. A spinning sensor head 10 comprises a set of sensors 11 (for example lasers), here five sensors are represented. The spinning sensor head 10 may spin around a vertical axis z to capture geometry data of a physical object, i.e. the 3D locations of points of the point cloud. The geometry data captured by the spinning sensor head is then represented in spherical coordinates ($r_{3D}$, $\phi$, $\theta$), where $r_{3D}$ is the distance of a point P from the spinning sensor head's center, $\phi$ is an azimuthal angle of the sensor head's spin relative to a referential, and $\theta$ is an elevation angle for an elevation angle index k of a sensor of the spinning sensor head relative to a horizontal referential plane (here the y axis). The elevation angle index k may be, for instance, an elevation angle of a sensor k, or a k-th sensor position, in case a single sensor is successively probing for the each one of the successive elevation angles.

Figure 3:
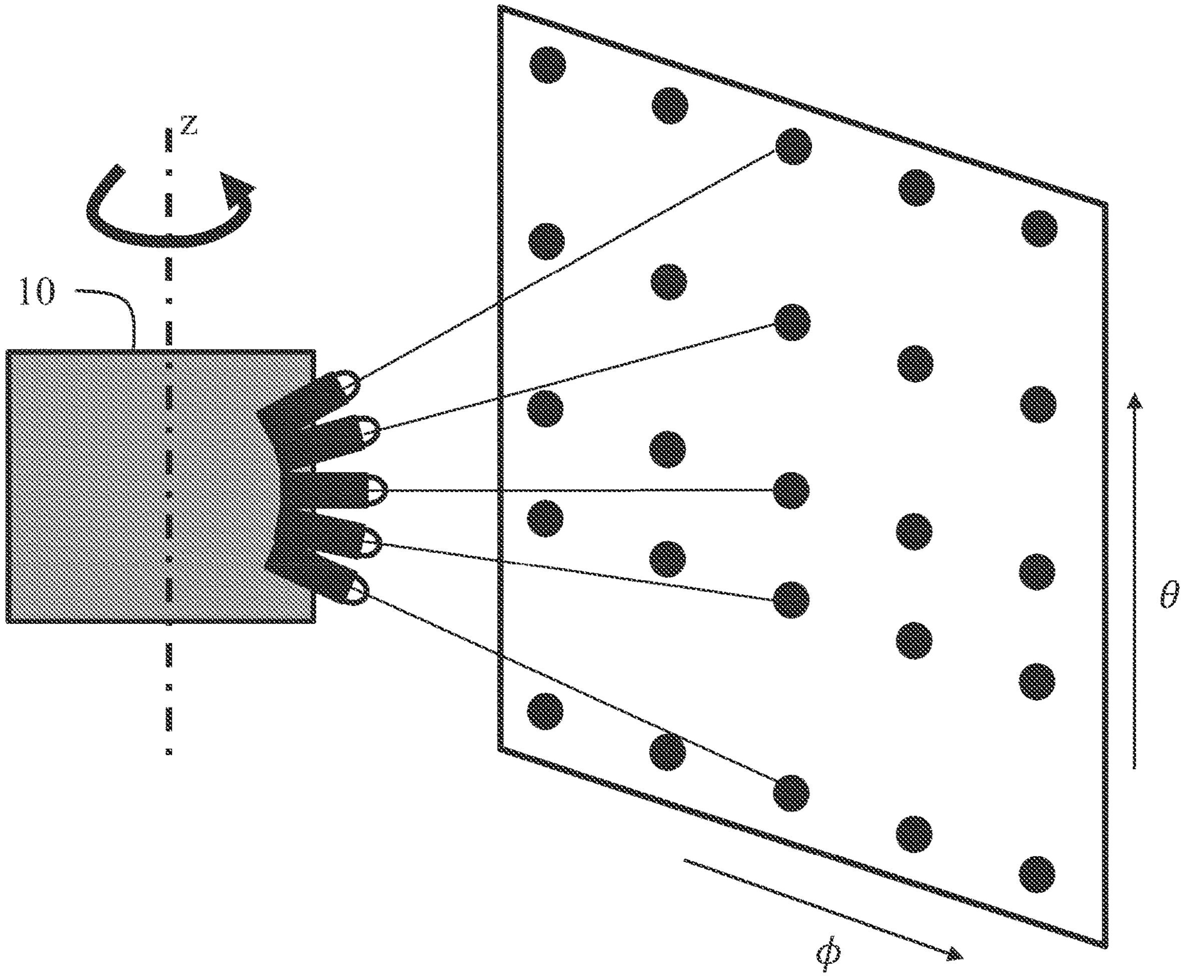
FIG. 3 shows a regular distribution of data captured by a spinning sensors head in accordance with prior art.

A regular distribution along the azimuthal angle has been observed on geometry data captured by a spinning sensor head as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i$ $\forall_i$=0 to I−1 where I is a number of azimuthal angles used for the capture of the points and $\theta_k$ ∀k=0 to K−1 where K is a number of sensors of the spinning sensor head 10. Basically, G-PCC represents sparse geometry data captured by a spinning sensor head on a 2D discrete angular plane ($\phi$, $\theta$) as depicted on FIG. 3, together with a radius value $r_{3D}$ for each point.

This quasi 1D property has been exploited in G-PCC in both the occupancy tree and the predictive tree by predicting, in the spherical coordinates space, the location of a current point is based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into coordinates ($\phi$, $\theta$) and from the location of these coordinates relative to discrete coordinates ($\phi_i$, $\theta_i$) obtained from already coded points.

Figure 4:
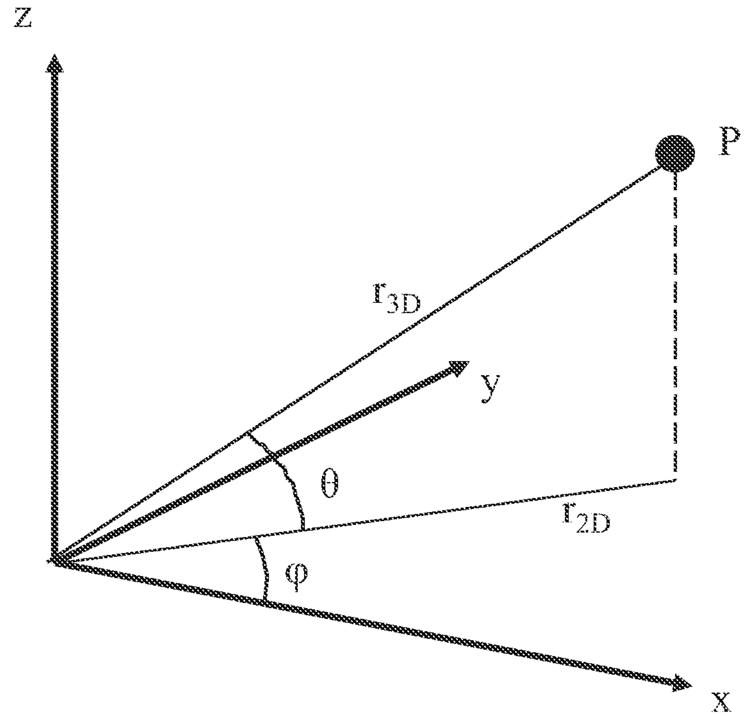
FIG. 4 shows a representation of a point in a 3D space in accordance with prior art.

The predictive tree directly codes a first version of location of a current point in the spherical coordinates (r, $\phi$, $\theta$), where r is the projected radius on the horizontal xy plane as depicted on FIG. 4 by $r_{2D}$, using the quasi 1D nature (r, $\phi_i$, $\theta_k$) of this coordinate space. Then, spherical coordinates (r, $\phi$, $\theta$) are converted into 3D cartesian coordinates (x, y, z) and a xyz residual is coded to tackle the errors of coordinate conversion, the approximation of elevation and azimuthal angles and potential noise.

Figure 5:
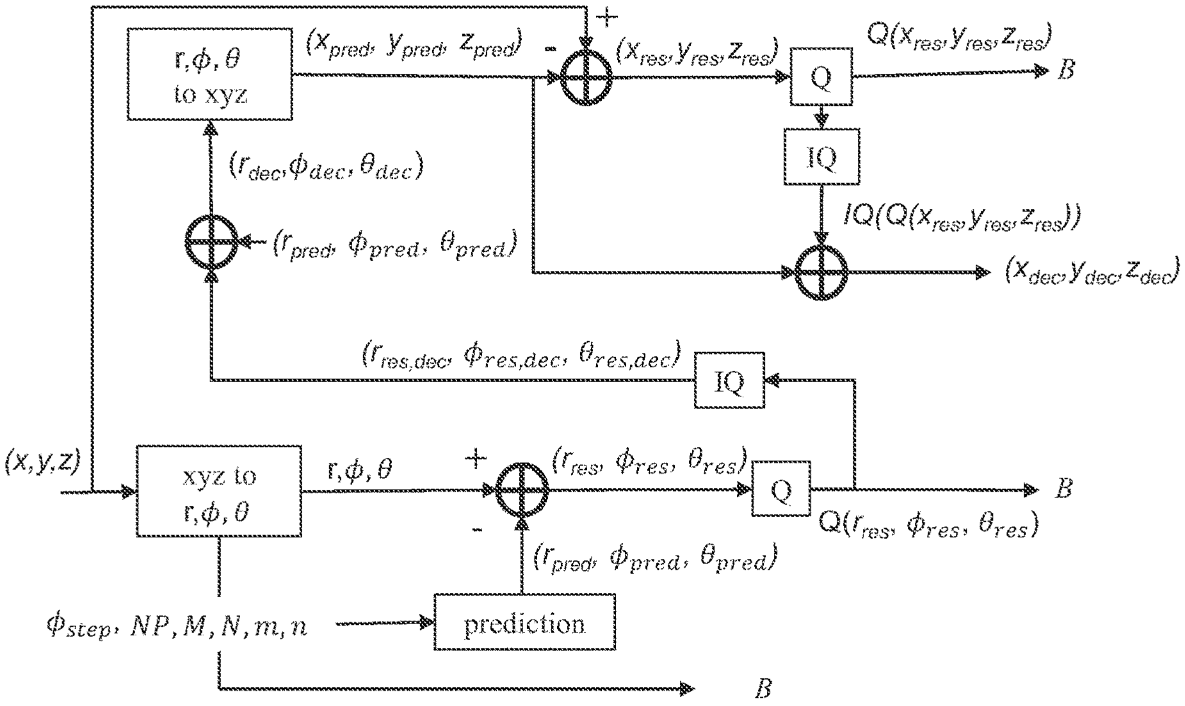
FIG. 5 shows a point cloud encoder that is similar to G-PCC predictive tree based encoder in accordance with prior art.

FIG. 5 shows a point cloud encoder that is similar to G-PCC predictive tree based encoder.

First, cartesian coordinates (x, y, z) of points of the point cloud are transformed into spherical coordinates (r, $\phi$, $\theta$) by (r, $\phi$, $\theta$)=C2A(x, y, z).

The transformation function C2A(.) is partly given by:

$$r = \text{round}\left(sqrt(x*x + y*y)/\Delta Ir\right)$$

$$\phi = \text{round}\left(a\tan 2(y, x)/\Delta I\phi\right)$$

where round( ) is the rounding operation to the nearest integer value, sqrt( ) is the square root function and a tan2(y, x) is the arc tangent applied to y/x.

$\Delta I r$ and $\Delta I\phi$ are internal precisions for radiuses and azimuthal angles respectively. They are typically the same as their respective quantization steps, i.e. $\Delta I\phi=\Delta\phi$, and $\Delta Ir=\Delta r$ with $$\Delta\phi = \frac{2*\pi}{2^N},$$

and, $$\Delta r = 2^M * \text{elementary quantization step}$$

where M and N are two parameters of the encoder that may be signaled in a bitstream, for example in a geometry parameter set, and where elementary quantization step is typically equal to 1. Typically, N may be 17, and M may be 0 for lossless coding.

The encoder may derive $\Delta\phi$ and $\Delta r$ by minimizing the cost (e.g. the number of bits) for coding the spherical coordinates representation and the xyz residual in cartesian space.

For sake of simplicity, $\Delta\phi=\Delta I\phi$ and $\Delta r=\Delta Ir$ hereafter.

Also for sake of clarity and simplicity, $\theta$ is used hereafter as an elevation angle value, that is obtained, for instance using $$\theta = a\tan\left(\frac{z}{r}\right),$$

where a tan(.) is an arc tangent function. But, in G-PCC for instance θ is an integer value representing the elevation angle index k of $\theta_k$ (i.e. the index of the k-th elevation angle), and so operations presented hereafter (prediction, residual (de)coding, etc. . . . ) performed on θ would be applied on the elevation angle index instead. Someone skilled in point cloud compression would easily understand the advantage of using index k, and how to use elevation angle index k instead of θ. Also, someone skilled in point cloud compression would easily understand that this subtility does not affect the principle of the present invention.

Residual spherical coordinates $(r_{res}, \phi_{res}, \theta_{res})$ between spherical coordinates $(r, \phi, \theta)$ and predicted spherical coordinates obtained from a predictor $PR_n$ are then given by:

$$(r_{res}, \phi_{res}, \theta_{res}) = (r, \phi, \theta) - (r_{pred}, \phi_{pred}, \theta_{pred}) = (r, \phi, \theta) - PR_n - (0, m * \phi_{step}, 0) \tag{1}$$

where $PR_n$ is a predictor selected from a list of candidate predictors $PR_0, \ldots, PR_{N-1}$, n is a predictor index that points to a selected predictor of the list of candidate predictors, and m is an integer number of elementary azimuthal steps $\phi_{step}$ to be added to a prediction of the azimuthal angle.

The elementary azimuthal step $\phi_{step}$ may be derived by the encoder from the frequencies and rotation speed at which a spinning sensors head is performing capture at the different elevation angles, for example from NP the number of probing per head turn:

$$\phi_{step} = \frac{2 * \pi}{NP * \Delta\phi},$$

and signaled in a bitstream in a geometry parameter set. Alternatively NP is a parameters of the encoder that may be signaled in a bitstream in a geometry parameter set, and $\phi_{step}$ is similarly derived in both encoder and decoder.

The residual spherical coordinates $(r_{res}, \phi_{res}, \theta_{res})$ may be encoded in a bitstream B.

The residual spherical coordinates $(r_{res}, \phi_{res}, \phi_{res})$ may be quantized (Q) in quantized residual spherical coordinates $Q(r_{res}, \phi_{res}, \phi_{res})$. Quantized residual spherical coordinates $Q(r_{res}, \phi_{res}, \theta_{res})$ may be encoded in a bitstream B.

The prediction index n and the number m are signalled into the bitstream B for each node of the predictive tree, while the elementary azimuthal step $\phi_{step}$ with some fixed-point precision is shared by all nodes of a same predictive tree.

The predictors of the list of predictors may be any predictor used for predicting radius, azimuthal angle and elevation angle associated with points of the point cloud.

For example, a candidate predictor $PR_0$ may equal to $(r_{min}, \phi_0, \theta_0)$, where $r_{min}$ is the minimum radius value (provided in a geometry parameter set for example), and $\phi_0$ and $\theta_0$ are equal to 0 if a current node (associated with a point P of the point cloud) has no parent or are equal to azimuthal and elevation angles of the point associated with a parent node.

Another candidate predictor $PR_1$ may equal to $(r_0, \phi_0, \theta_0)$, where $r_0$, $\phi_0$ and $\theta_0$ are respectively the radius, azimuthal and elevation angle of the point associated with the parent node of a current node.

Another candidate predictor $PR_2$ may equal to a linear prediction of the radius, azimuthal and elevation angles using the radius, azimuthal and elevation angles $(r_0, \phi_0, \theta_0)$, of the point associated with the parent node of a current node, and the radius, azimuthal and elevation angle $(r_1, \phi_1, \theta_1)$ of the point associated with the grand-parent node.

$$\text{For example, } PR_2 = 2^*(r_0, \phi_0, \theta_0) - (r_1, \phi_1, \theta_1)$$

Another candidate predictor $PR_3$ may equal to a linear prediction of the radius, azimuthal and elevation angles using the radius, azimuthal and elevation angles $(r_0, \phi_0, \theta_0)$ of the point associated with the parent node of a current node, the radius, azimuthal and elevation angles $(r_1, \phi_1, \theta_1)$ of the point associated with the grand-parent node and the radius and the azimuthal and elevation angles $(r_2, \phi_2, \phi_2)$ of the point associated with the great grand-parent.

$$\text{For example, } PR_3 = (r_0, \phi_0, \theta_0) + (r_1, \phi_1, \theta_1) - (r_2, \phi_2, \theta_2).$$

Another candidate predictor $PR_4$ may also equal to:

$$PR_4 = (r_{dec}, \phi_{dec}, \theta_0)$$

where $\phi_0$ equals either to 0 if the node of a predictive tree associated with a point P of the point cloud has no parent, either to the elevation angle of the point associated with the parent node or to a predetermined minimum elevation angle, and where $r_{dec}$ and $\phi_{dec}$ are a previously decoded radius and previously decoded azimuthal angle associated, for example, to a the parent node.

Predicted cartesian coordinates $(x_{pred}, y_{pred}, z_{pred})$ are obtained by inverse transforming decoded spherical coordinates $(r_{dec}, \phi_{dec}, \theta_{dec})$ by:

$$(x_{pred}, y_{pred}, z_{pred}) = A2C(r_{dec}, \phi_{dec}, \theta_{dec}) \tag{2}$$

where decoded spherical coordinates $(r_{dec}, \phi_{dec}, \theta_{dec})$, as by a decoder, may be given by:

$$(r_{dec}, \phi_{dec}, \theta_{dec}) = (r_{res,dec}, \phi_{res,dec}, \theta_{res,dec}) + PR_n + (0, m^* \phi_{step}, 0), \tag{3}$$

where $(r_{res,dec}, \phi_{res,dec}, \theta_{res,dec})$ are decoded residual spherical coordinates, as by a decoder.

The decoded residual spherical coordinates $(r_{res,dec}, \phi_{res,dec}, \theta_{res,dec})$ may be the result of the inverse quantization (IQ) of quantized residual spherical coordinates $Q(r_{res}, \phi_{res}, \theta_{res})$.

In G-PCC, there is no quantization of residual spherical coordinates, and the decoded spherical coordinates $(r_{res,dec}, \phi_{res,dec}, \theta_{res,dec})$ equal to the residual spherical coordinates $(r_{res}, \phi_{res}, \theta_{res})$. The decoded spherical coordinates $(r_{dec}, \phi_{dec}, \theta_{dec})$ are then equal to the spherical coordinates $(r, \phi, \theta)$.

Inverse transforming decoded spherical coordinates ($r_{dec}$, $\phi_{dec}$, $\theta_{dec}$) may be given by:

$$r = r_{dec} * \Delta r$$

$$x_{pred} = \text{round}(r * \cos(\phi_{dec} * \Delta\phi))$$

$$y_{pred} = \text{round}(r * \sin(\phi_{dec} * \Delta\phi))$$

$$z_{pred} = \text{round}(\tan(\theta_{dec}) * r)$$

where sin( ) and cos( ) are sine and cosine functions. These two functions may be approximated by operations working on fixed-point precision. The values $\tan(\theta_{dec})$ may be also stored as fixed-point precision values. Consequently, no floating-point operation is used in the decoder. Avoiding floating point operations is usually a strong requirement to ease the hardware implementations of codecs.

Residual cartesian coordinates ($x_{res}$, $y_{res}$, $z_{res}$) between the original points and predicted cartesian coordinates ($x_{pred}$, $y_{pred}$, $z_{pred}$) are given by:

$$(x_{res}, y_{res}, z_{res}) = (x, y, z) - (x_{pred}, y_{pred}, z_{pred})$$

Residual cartesian coordinates ($x_{res}$, $y_{res}$, $z_{res}$) are quantized (Q) and quantized residual cartesian coordinates $Q(x_{res}, y_{res}, z_{res})$ are encoded into the bitstream.

Residual cartesian coordinates may be lossless coded when x, y, z quantization steps are equal to the original point precision (typically 1), or lossy coded when quantization steps are larger than the original point precision (typically quantization steps larger than 1).

Decoded cartesian coordinates ($x_{dec}$, $y_{dec}$, $z_{dec}$), as by a decoder, are given by:

$$(x_{dec}, y_{dec}, z_{dec}) = (x_{pred}, y_{pred}, z_{pred}) + IQ(Q(x_{res}, y_{res}, z_{res})) \quad (4)$$

where $IQ(Q(x_{res}, y_{res}, z_{res}))$ represents inverse-quantized quantized residual cartesian coordinates.

Those decoded cartesian coordinates ($x_{dec}$, $y_{dec}$, $z_{dec}$) may be used by the encoder for example for ordering (decoded) points before attribute coding.

Figure 6:
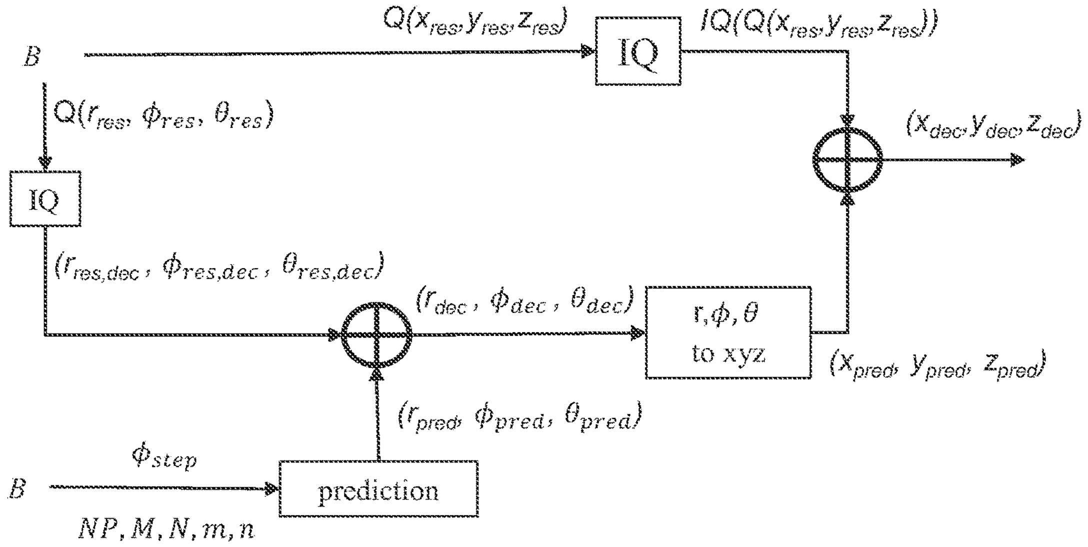
FIG. 6 shows a point cloud decoder that is similar to G-PCC predictive tree based decoder in accordance with prior art.

FIG. 6 shows a point cloud decoder that is similar to G-PCC predictive tree based decoder for the predictive tree.

A prediction index n and a number m are accessed from the bitstream B for each node of the predictive tree, while the elementary azimuthal step $\phi_{step}$ is accessed from a parameter set of the bitstream B and is shared by all nodes of a same predictive tree.

Decoded residual spherical coordinates ($r_{res,dec}$, $\phi_{res,dec}$, $\theta_{res,dec}$) may be obtained by decoding residual spherical coordinates ($r_{res}$, $\phi_{res}$, $\theta_{res}$) from the bitstream B.

Quantized residual spherical coordinates $Q(r_{res}, \phi_{res}, \theta_{res})$ may be decoded from the bitstream B. The quantized residual spherical coordinates $Q(r_{res}, \phi_{res}, \theta_{res})$ are inverse quantized to obtain decoded residual spherical coordinates ($r_{res,dec}$, $\phi_{res,dec}$, $\theta_{res,dec}$).

Decoded spherical coordinates ($r_{dec}$, $\phi_{dec}$, $\theta_{dec}$) are obtained by adding decoded residual spherical coordinates ($r_{res,dec}$, $\phi_{res,dec}$, $\theta_{res,dec}$) and predicted spherical coordinates ($r_{pred}$, $\phi_{pred}$, $\theta_{pred}$) according to equation (3).

Predicted cartesian coordinates ($x_{pred}$, $y_{pred}$, $z_{pred}$) are obtained by inverse transforming decoded spherical coordinates ($r_{dec}$, $\phi_{dec}$, $\theta_{dec}$ accoding to equation (2).

Quantized residual cartesian coordinates $Q(x_{res}, y_{res}, z_{res})$ are decoded from the bitstream B and inverse quantized to obtain inverse quantized cartesian coordinates $IQ(Q(x_{res}, y_{res}, z_{res}))$. The decoded cartesian coordinates ($x_{dec}$, $y_{dec}$, $z_{dec}$) are given by equation (4).

Figure 7:
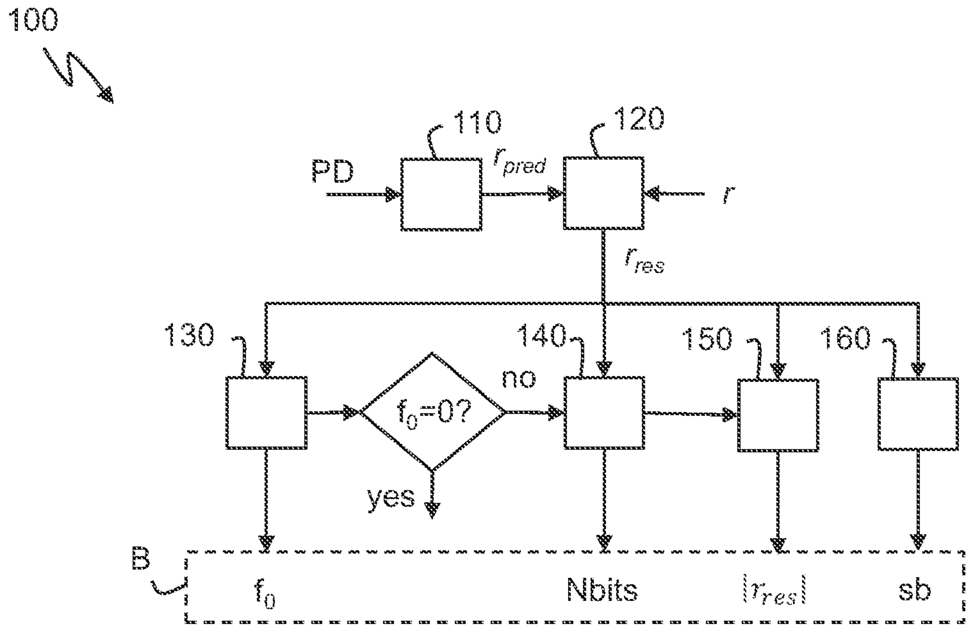
FIG. 7 shows a block diagram of step of a method 100 of encoding a radius residual of residual spherical coordinates of a point of the point cloud into a bitstream in accordance with prior art.

FIG. 7 shows a block diagram of step of a method 100 of encoding a radius residual $r_{res}$ of residual spherical coordinates ($r_{res}$, $\phi_{res}$, $\theta_{res}$) of a point P of the point cloud into the bitstream B in accordance with prior art.

FIG. 7 may also apply for encoding a quantized radius residual.

In step 110, a predicted radius $r_{pred}$ is obtained from prediction data PD. The predicted radius $r_{pred}$ is representative of a prediction of a radius of the point P. The prediction data PD is encoded into a bitstream B.

For example, the predicted radius is obtained by selection of a predictor of a list of predictors. Selection may be done, for instance, by using a rate cost function- or a rate-distortion cost function- (in case of lossy coding) based optimization process that selects the predicted radius from a list of candidate predicted radiuses that minimizes said cost function.

In step 120, a radius residual $r_{res}$ of the point P is obtained between a radius r of said point and the predicted radius $r_{pred}$ (equation 1).

In step 130, a first binary data (flag) $f_0$ is entropy encoded into the bitstream B. The binary data $f_0$ equals a first value, e.g. 0, to indicate that the radius residual $r_{res}$ equals 0 and equals a second value, e.g. 1, to indicate that the radius residual $r_{res}$ does not equal 0. If the binary data $f_0$ equals the first value, the method ends. Otherwise, a bit number Nbits is obtained for encoding the magnitude (absolute value $|r_{res}|$) of the radius residual $r_{res}$ (minus 1) by:

$$Nbits = \log2(|r_{res}| - 1)$$

In step 140, each bit of a series of bits representative of the bit number Nbits is iteratively entropy encoded into the bitstream B, starting from the lowest bit to the highest bit. Note the highest bit of the series of bits representative of the magnitude of the radius residual $r_{res}$ always equals 1, so the highest bit is not needed to be encoded.

In step 150, each of the lowest (Nbits−1) bits of the series of bits representative of the magnitude of the radius residual $r_{res}$ is bypass encoded into the bitstream B starting from the lowest bit to the highest bit.

In step 160, a sign bit sb of the radius residual $r_{res}$ is entropy encoded into the bitstream B.

Figure 8:
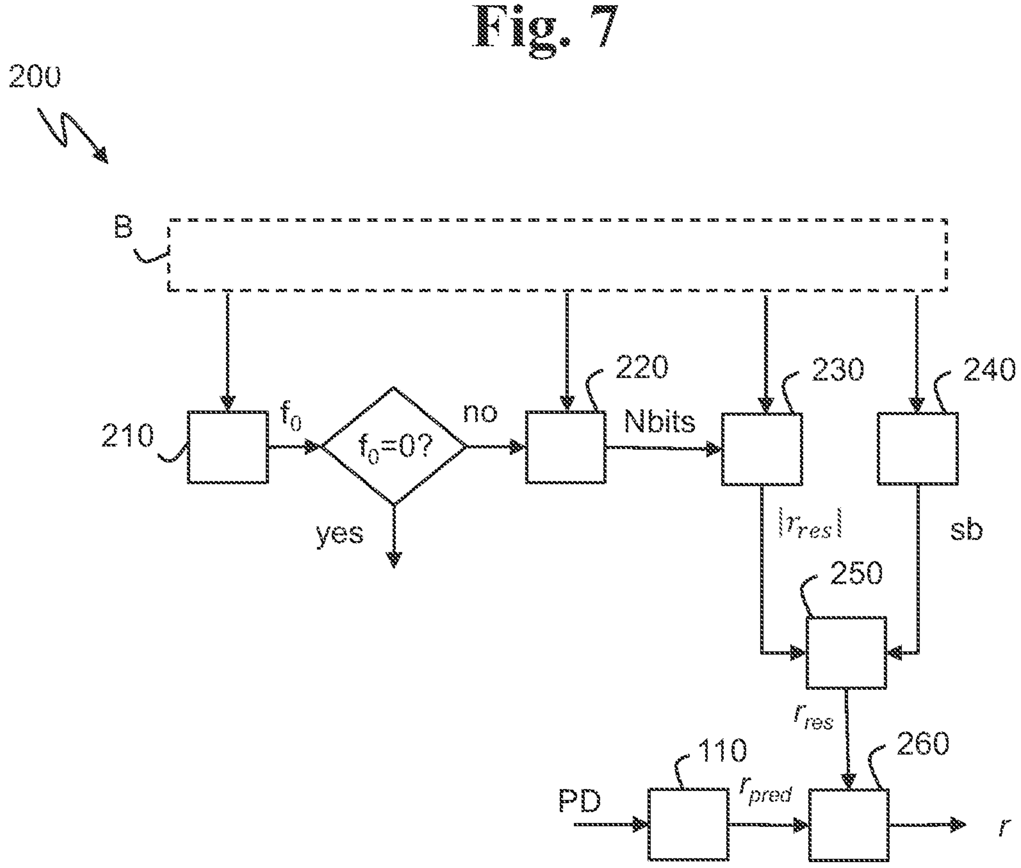
FIG. 8 shows a block diagram of step of a method 200 of decoding a radius residual of residual spherical coordinates of a point of the point cloud from a bitstream in accordance with prior art.

FIG. 8 shows a block diagram of step of a method 200 of decoding a radius residual $r_{res}$ of residual spherical coordinates ($r_{res}$, $\phi_{res}$, $\theta_{res}$) of a point P of the point cloud from the bitstream B in accordance with prior art.

FIG. 8 may also apply for decoding a quantized radius residual.

In step 210, a first binary data (flag) $f_0$ is entropy decoded from the bitstream B. If the binary data $f_0$ equals to the first value, the method ends.

Otherwise, in step 220, a series of bits representative of the bit number Nbits is iteratively entropy decoded from the bitstream B, starting from the lowest bit to the highest bit.

In step 230, each of the lowest (Nbits−1) bits of the series of bits representative of the magnitude of the radius residual $r_{res}$ is bypass decoded from the bitstream B starting from the lowest bit to the highest bit.

In step 240, a sign bit sb of the radius residual $r_{res}$ is entropy decoded from the bitstream B.

In step 250, the decoded radius residual $r_{res}$ is obtained from the decoded magnitude of the radius residual $r_{res}$ and the decoded sign sb.

In step 260, the decoded radius r is obtained by adding the decoded radius residual $r_{res}$ with the predicted radius $r_{pred}$ provided in step 110 from prediction D, possibly decoded from the bitstream B.

The encoding/decoding of the radius residual $r_{res}$ is not efficient because of the weakness of the entropy encoding/decoding of the binary data $f_0$ that doesn't make use of any prior information and because the series of Nbits representative of the magnitude of the radius residual $r_{res}$ is bypass encoded/decoded. Consequently, most of the bitrate allowed for transmitting or storing a point cloud is made of data representing the radius residual. The inventor observed that residual data constitutes more than 70% of the bitstream B.

At least one exemplary embodiment of the present application has been devised with the foregoing in mind.

At least one of the aspects generally relates to point cloud encoding and decoding, and at least one other aspect generally relates to transmitting a bitstream generated or encoded.

The present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

The present invention relates to a method of encoding/decoding a point cloud, into a bitstream of encoded point cloud data, each point of the point cloud being associated with a radius responsive to a distance of the point from a sensor that captured the point. A context is selected based on prediction data used for predicting the radius of the point and radius residual associated with points of the point cloud entropy is encoded/decoded by using the selected contexts.

Prediction data used to obtain a prediction of a radius associated with a point of the point cloud is also used, according to the present invention, to determine a context that gets an accurate probability of bit values representing a radius residual.

This is particularly true when prediction data is relative to a predictor of a dynamic list of predictors.

A dynamic list of predictors is particularly useful (but not only) for obtaining/deriving better prediction after a laser beam has moved from a first object, with a first distance, to another object, with a different distance, has passed over it and is passing back to the first object. It may occur, for instance, when one object is in front of another one (like a car in front of a wall, for instance), or when an object has holes (walls with open doors or windows, or entrance wall for instance).

Basically, the dynamic list of predictors may be updated as follows: a predictor index is obtained from which a predicted radius is determined. The predictor index is selected from a dynamic list of predictors to minimize a bit cost of a radius residual between a radius of a current point of the point cloud and the predicted radius. The radius residual is then obtained and compared to a radius residual threshold. If the obtained radius residual is greater than the obtained radius residual threshold, it is considered that the current point could be part of a new object (with a different distance), and so that a new element shall be added to the dynamic list of predictors, enabling to obtain/derive a new predictor better suited for that object. Since it is better to limit the size in memory of the dynamic list, if the list is already full (e.g. a maximum number of elements in the list is reached) the last element in the dynamic list of predictors is discarded (i.e. it is removed from the list) and the new element is inserted on top of the dynamic list of predictors (i.e. it is inserted to become the first element in the list). If the obtained radius residual is not greater than the obtained radius residual threshold, it is considered that the current point is part of the same object as the one from which was obtained the prediction data stored in an i-th element of the dynamic list of predictors, and so the i-th element is updated using the current encoded/decoded point. Since the predictor obtained/derived from that i-th element has just been used, there is much more chance that it is used again for next points. Then, the dynamic list of predictors is updated such that the i-th element is moved on top of the list, improving the probability of said first element to be selected again.

Statistically, cases when the obtained radius residual is greater than the radius residual threshold happen rarely in point cloud dataset, i.e. most points in point clouds belong to a same object. The best predictor for each of those points is more probably to be the last already encoded/decoded point of said object. This best predictor is thus very often the first element the dynamic predictor list as explained above. Consequently, the predictor index n of the selected predictor for these points is more probably 0 (n=0), which can be used to improve the entropy encoding/decoding of the magnitude of the radius residual.

In one exemplary embodiment, prediction data comprises a predictor index that points to the predictor of the list of said at least one predictor.

This exemplary embodiment improves the entropy encoding/decoding efficiency of point cloud for the following reasons. Cases when the obtained radius residual is greater than the radius residual threshold only happen when points are at the edge of objects of different depths (distances from the sensor), and the last already encoded/decoded point is naturally not the closest point of a current coded point since it's from an object of different depth. The encoder may search from other elements (not the first element) in the dynamic list of predictors to get best predictor and then one gets i>0.

Thus, if the predictor index equals to 0, then it's more probable that a current point belong to the same object as a predicted point associated with a predicted radius, so the magnitude of radius residual is more probably smaller. If the predictor index is not equal to 0, then it's more probable that the current point does not belong to the same object as a predicted point, so the magnitude of the radius residual is more probable to be larger than when the predictor index equals 0. Thus, the statistics of the magnitude of the radius residual when the predictor index equals 0 is different from when the predictor index is not equal to 0. Entropy encoding/decoding the magnitude of the radius residual based on context selected from prediction data, such as the predictor index, provides very high entropy coding performance.

In one exemplary embodiment, each point of the point cloud is further associated with an azimuthal angle responsive to a capture angle of the sensor. A predicted azimuthal angle is then obtained by adding an azimuthal angle obtained from the prediction data with an azimuthal angle shift defined as a product of an integer number by an elementary azimuthal step (equation 1). The prediction data comprises said integer number.

If the integer number m is equal to 0, then a current point is sensed (captured) with the same or similar azimuthal angle as a predicted point associated with a predicted radius, and the two points are spatially close, so the radius residual between them is naturally to be very small, and almost close to 0. If the integer number m is not equal to 0, then there is a high probability that the predicted point is not close to current point, so the magnitude of the radius residual is much larger. Thus, the statistics of magnitude of the radius residual when the integer number m is equal to 0 is different from that when the integer number m is not equal to 0. The different statistics of magnitude of the radius residual correlated with the prediction data, consisting at least in the predictor index n and the integer number m can be used as prior information to improve the compression efficiency of the magnitude of the radius residual.

Figure 9:
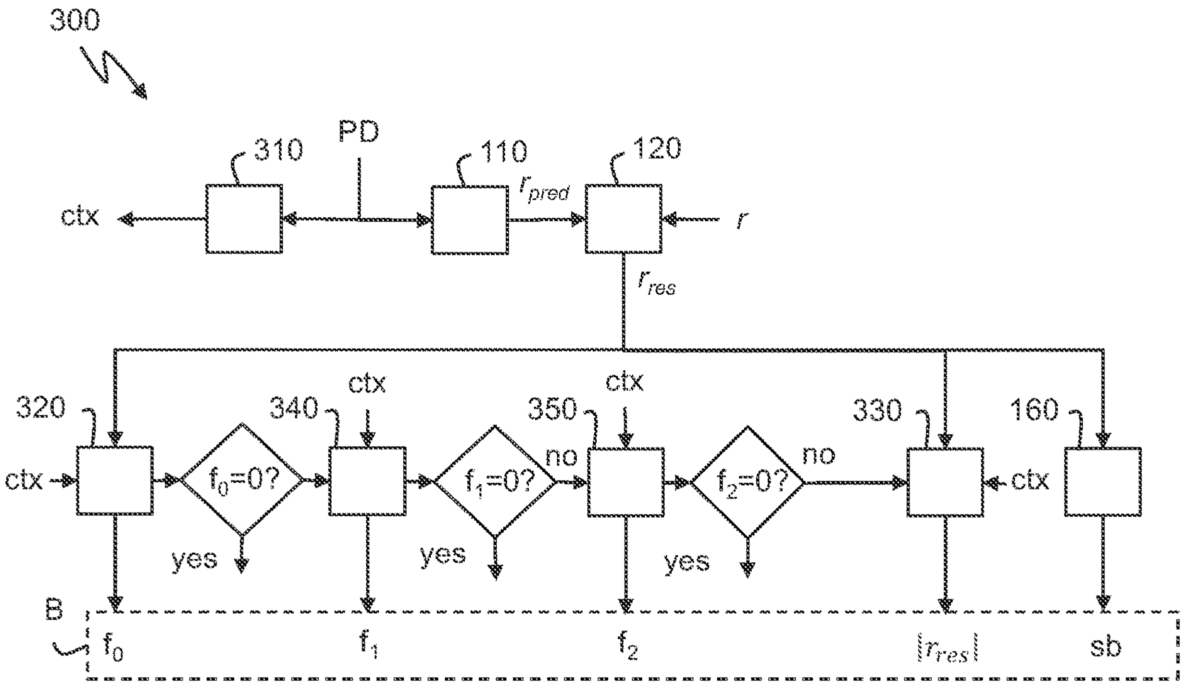
FIG. 9 shows a block diagram of step of a method 300 of encoding a radius residual of residual spherical coordinates of a point of the point cloud into a bitstream in accordance with at least one exemplary embodiment.

FIG. 9 shows a block diagram of step of a method 300 of encoding a radius residual $r_{res}$ of residual spherical coordinates ($r_{res}$, $\phi_{res}$, $\theta_{res}$) of a point P of the point cloud into a bitstream B in accordance with at least one exemplary embodiment.

In step 310, a context ctx is selected from the prediction data PD. The prediction data is encoded into the bitstream PD.

In step 320, the binary data (flag) $f_0$ is context-based entropy encoded based on the selected context ctx. If the binary data $f_0$ equals to a first value, e.g. 0, the method ends.

Otherwise, in step 330, each bit of a series of bits representative of the magnitude of the radius residual $r_{res}$ (minus 1) is iteratively context-based entropy encoded based on the selected context ctx.

Optionally, in step 340, a binary data (flag) $f_1$ is context-based entropy encoded based on the selected context ctx.

The binary data $f_1$ equals to a first value, e.g. 0, to indicate that the magnitude of the radius residual $r_{res}$ equals to 1 and equals to a second value, e.g. 1, to indicate that the magnitude of the radius residual $r_{res}$ is greater than 1. If the binary data $f_1$ equals to the first value, the method of encoding the magnitude of the radius residual ends. Otherwise, In step 330, each of a series of bits representative of the absolute value $|r_{res}|$ of the radius residual $r_{res}$ minus 2 is context-based entropy encoded based on the selected context ctx.

Optionally, in step 350, a binary data (flag) $f_2$ is context-based entropy encoded based on the selected context ctx.

The binary data $f_2$ equals to a first value, e.g. 0, to indicate that the magnitude of the radius residual $r_{res}$ equals to 2 and equals to a second value, e.g. 1, to indicate that the magnitude of the radius residual $r_{res}$ is greater than 2. If the binary data $f_2$ equals to the first value, the method of encoding the magnitude of the radius residual ends. Otherwise, in step 330, each of a series of bits representative of the absolute value $|r_{res}|$ of the radius residual $r_{res}$ minus 3 is context-based entropy encoded based on the selected context ctx.

Figure 10:
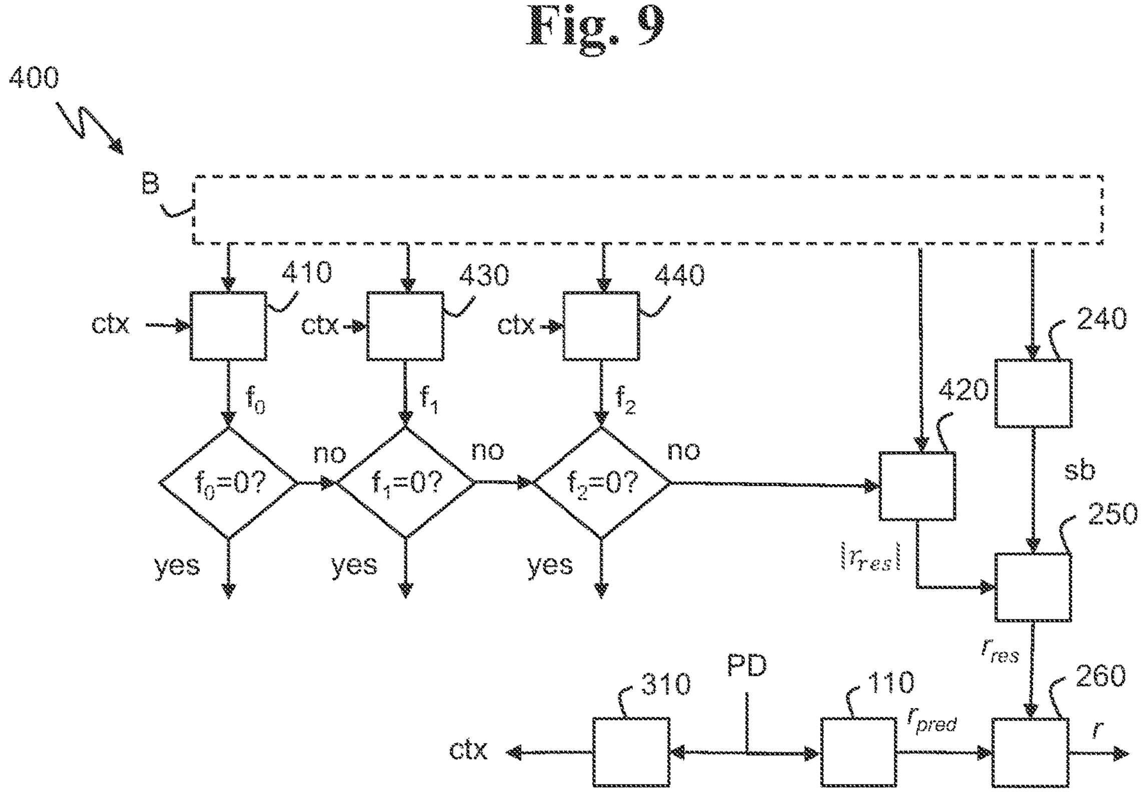
FIG. 10 shows a block diagram of step of a method 400 of decoding a radius residual of residual spherical coordinates of a point of the point cloud from a bitstream in accordance with at least one exemplary embodiment.

FIG. 10 shows a block diagram of step of a method 400 of decoding a radius residual of residual spherical coordinates of a point of the point cloud from a bitstream in accordance with at least one exemplary embodiment.

In step 310, a context ctx is selected from the prediction data PD, possible decoded from the bitstream B.

In step 410, a binary data (flag) $f_0$ is context-based entropy decoded based on the selected context ctx. If the binary data $f_0$ equals to the first value, the method ends.

Otherwise, in step 420, each of the series of bits representative of the magnitude of the radius residual $r_{res}$ (minus 1) is context-based entropy decoded based on the selected context ctx.

Optionally, in step 430, a binary data (flag) $f_1$ is context-based entropy decoded based on the selected context ctx.

If the binary data $f_1$ equals to a first value, e.g. 0, the method of decoding the magnitude of the radius residual ends. Otherwise, in step 420, each of a series of bits representative of the absolute value $|r_{res}|$ of the radius residual $r_{res}$ (minus 2) is context-based entropy decoded based on the selected context ctx.

Optionally, in step 440, a binary data (flag) $f_2$ is context-based entropy decoded based on the selected context ctx.

If the binary data $f_2$ equals to a first value, e.g. 0, the method of decoding the magnitude of the radius residual ends. Otherwise, each of a series of bits representative of the absolute value $|r_{res}|$ of the radius residual $r_{res}$ (minus 3) is context-based entropy decoded based on the selected context ctx.

In one exemplary embodiment of step 310, prediction data PD may comprise a predictor index n that points to a predictor $PR_n$ selected from a list of at least one predictor comprising each a predicted radius, and the context ctx is selected from the predictor index n.

For example, a context index ctxIdx of a one dimensional context table ctxTable_T is the predictor index n and the context ctx is selected from an entry of the context table ctxTable_T:

$$ctx = \text{ctxTable\_T}[ctxIdx]$$

This exemplary embodiment is advantageous because the statistics of the radius residual may be different if the predictor index n within a list of at least one predictor is equal to different values. So, separating statistics of radius residual magnitude according to different predictor index optimized the context selection and thus the encoding of the magnitude of the residual data and of the binary flag $f_0$.

In one exemplary embodiment 310, prediction data PD may comprise the integer number m (equation 1), and the context ctx is selected from the integer number m.

In one exemplary embodiment of step 310, prediction data PD may comprise both a predictor index n and an integer number m and the context ctx is selected from the predictor index n and the integer number m.

In one exemplary embodiment of step 310, selecting the context ctx based on the predictor index n and the integer number m comprises determining a context index ctxIdx from the predictor index n and the integer number m and selecting the context ctx from an entry of one dimensional context table ctxTable_T:

$$ctx = \text{ctxTable\_T}[ctxIdx]$$

In one exemplary embodiment of step 310, the context index ctxIdx is obtained as follows:

$$ctxIdx = \begin{cases} 0, & \text{if } n \neq 0 \text{ and } m = 0 \\ 1, & \text{if } n \neq 0 \text{ and } m \neq 0 \\ 2, & \text{if } n = 0 \text{ and } m = 0 \\ 3, & \text{if } n = 0 \text{ and } m \neq 0 \end{cases}$$

where the context table ctxTable_T is specific to the data to be entropy coded. Different context tables are used for context-based entropy encoding/decoding the binary data $f_0$ and the magnitude of the radius residual $r_{res}$.

In one exemplary embodiment of step 310, the context index ctxIdx is obtained as follows:

$$ctxIdx = \begin{cases} 0, & \text{if } m = 0 \text{ and } n = 0 \\ 1, & \text{if } m = 0 \text{ and } n = 1 \\ \vdots & \\ N-1, & \text{if } m = 0 \text{ and } n = N-1 \\ N, & \text{if } m \neq 0 \text{ and } n = 0 \\ N+1, & \text{if } m \neq 0 \text{ and } n = 1 \\ \vdots & \\ 2N-1, & \text{if } m \neq 0 \text{ and } n = N-1 \end{cases}$$

or put it simpler in C-like code $$ctxIdx = n + N * (m \neq 0)$$

where N is the number of predictor indices.

In one variant, the context ctx is selected from an entry of a two dimensional context table ctxTable_T:

$$ctx = \text{ctxTable\_T}[ctxIdx1][ctxIdx2]$$

where the context index ctxIdx1 is responsive of the predictor index n and the context index ctxIdx2 is responsive of the integer number m.

In one embodiment, the series of bits is encoded/decoded as a unary code that is context-based entropy encoded based on the selected context ctx.

In one embodiment, the series of bits is encoded as an Exponential-Golomb code that is context-based entropy encoded/decoded based on the selected context ctx.

In one exemplary embodiment, the binary data $f_0$ and/or the series of bits representative of magnitude of the radius residual $r_{res}$ is context-based entropy encoded/decoded by a Context-Adaptive Binary Arithmetic Coder/decoder (CABAC).

Figure 11:
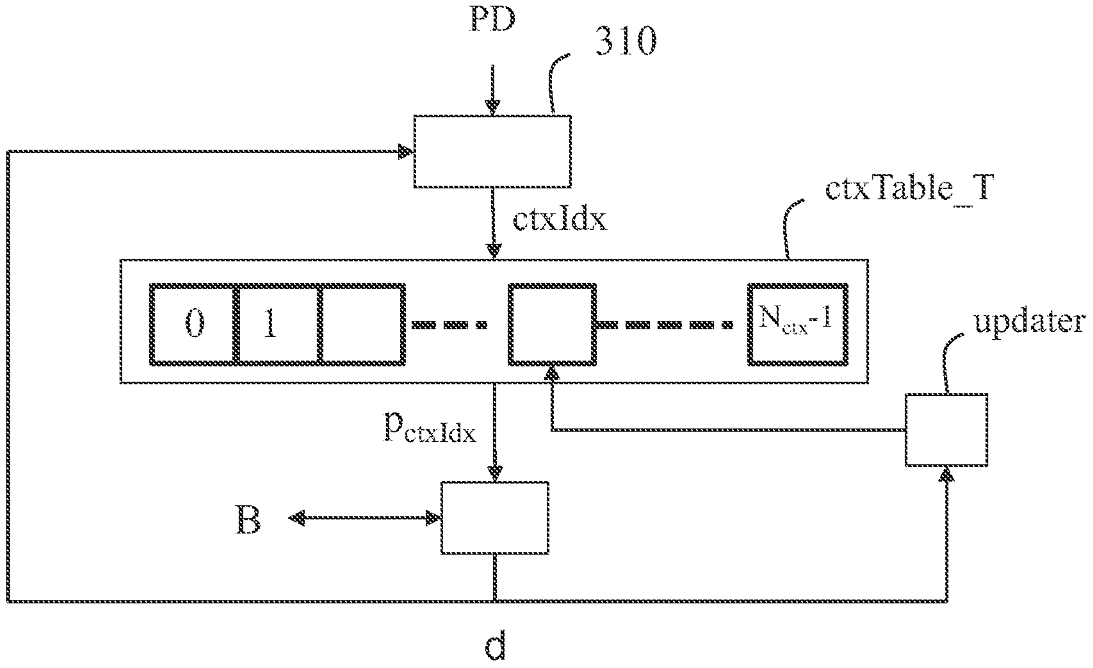
FIG. 11 shows a schematic block diagram of steps of a Context Adaptive Binary Arithmetic Coder in accordance with at least one exemplary embodiment.

FIG. 11 shows a schematic block diagram of steps of a Context Adaptive Binary Arithmetic Coder in accordance with at least one exemplary embodiment.

In step 310, the context index ctxIdx is obtained based on the prediction data PD as above explained.

A context table ctxTable_T with $N_{ctx}$ entries stores probabilities $p_{ctxIdx}$ associated with the contexts ctx. A probability $p_{ctxIdx}$ is obtained as the ctxIdx-th entry of the context table. The context ctx is thus selected based on the prediction data PD by $$ctx = \text{ctxTable\_T}[ctxIdx].$$

In step 320, 330 and/or 340, a binary data d, i.e. the binary data $f_0$ and/or a bit of the series of bits representative of the magnitude of the radius residual, is entropy encoded in the bitstream B using the probability $p_{ctxIdx}$.

Entropy coders are usually arithmetic coders but may be any other type of entropy coders like asymmetric numeral systems. In any case, optimal coders add $-\log 2(p_{ctxIdx})$ bits in the bitstream B to encode a binary data d=1 or $-\log 2(1-p_{ctxIdx})$ bits in the bitstream B to encode d=0. Once the binary data d is encoded, the probability $p_{ctxIdx}$ is updated by using an updater taking the encoded binary data d and the probability $p_{ctxIdx}$ as entries; the updater is usually performed by using updated tables. The updated probability replaces the ctxIdx-th entry of the context table ctxTable_T. Then, another binary data d can be encoded, and so on.

A Context-Adaptive Binary Arithmetic decoder performs essentially the same operations as the Context-Adaptive Binary Arithmetic encoder except that the coded binary data d is decoded from the bitstream B by an entropy decoder using the probability $p_{ctxIdx}$.

Figure 12:
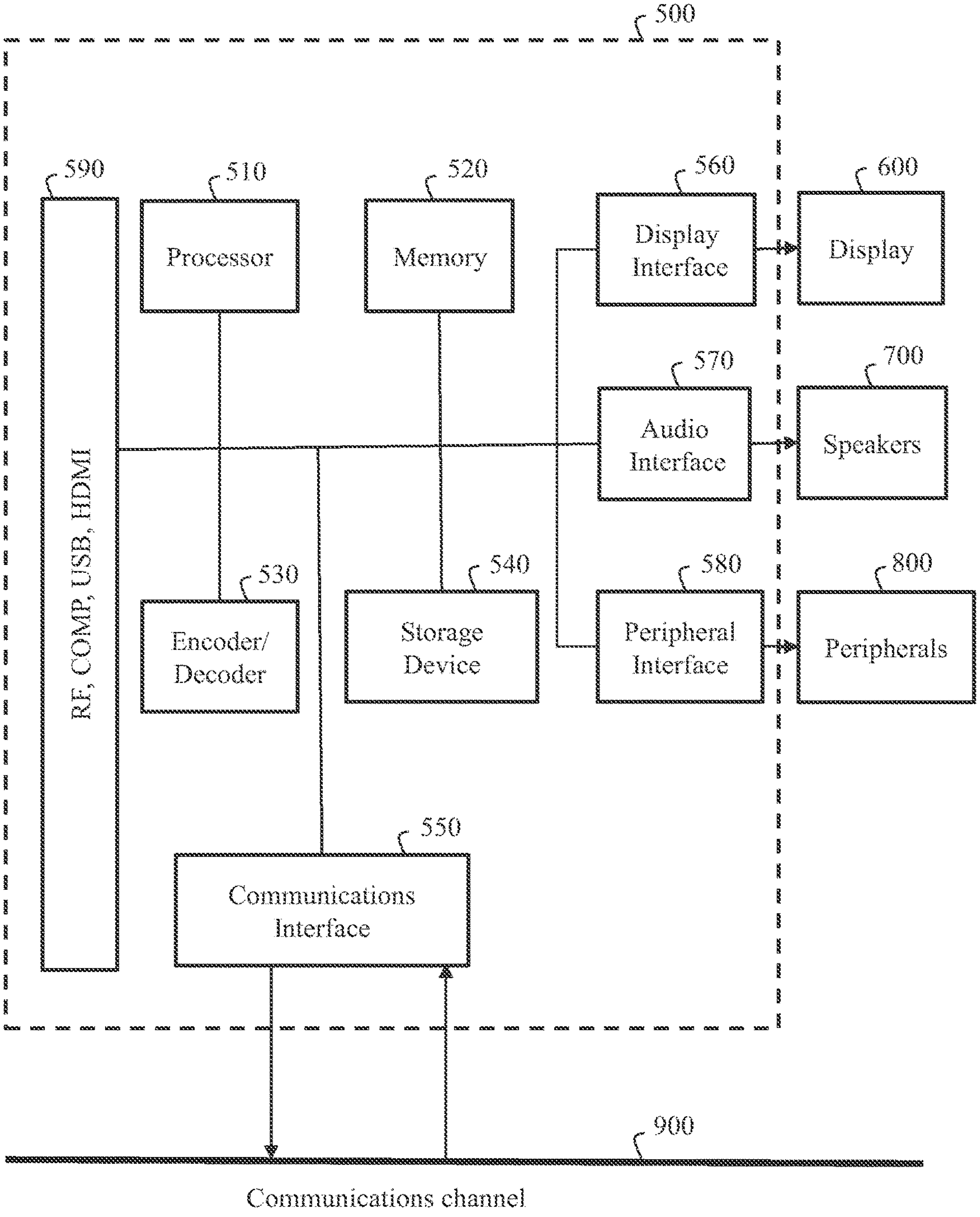
FIG. 12 shows a schematic block diagram of an example of a system in which various aspects and exemplary embodiments are implemented.

FIG. 12 shows a schematic block diagram illustrating an example of a system in which various aspects and exemplary embodiments are implemented.

System 500 may be embedded as one or more devices including the various components described below. In various embodiments, the system 500 may be configured to implement one or more of the aspects described in the present application.

Examples of equipment that may form all or part of the system 500 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices.

As should be clear, the equipment may be mobile and even installed in a mobile vehicle.

Elements of system 500, singly or in combination, may be embodied in a single integrated circuit (IC), multiple ICs, and/or discrete components. For example, in at least one embodiment, the processing and encoder/decoder elements of system 500 may be distributed across multiple ICs and/or discrete components. In various embodiments, the system 500 may be communicatively coupled to other similar systems, or to other electronic devices, via, for example, a communications bus or through dedicated input and/or output ports.

The system 500 may include at least one processor 510 configured to execute instructions loaded therein for implementing, for example, the various aspects described in the present application. Processor 510 may include embedded memory, input output interface, and various other circuitries as known in the art. The system 500 may include at least one memory 520 (for example a volatile memory device and/or a non-volatile memory device). System 500 may include a storage device 540, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 540 may include an internal storage device, an attached storage device, and/or a network accessible storage device, as non-limiting examples.

The system 500 may include an encoder/decoder module 530 configured, for example, to process data to provide encoded/decoded point cloud geometry data, and the encoder/decoder module 530 may include its own processor and memory. The encoder/decoder module 530 may represent module(s) that may be included in a device to perform the encoding and/or decoding functions. As is known, a device may include one or both of the encoding and decoding modules. Additionally, encoder/decoder module 530 may be implemented as a separate element of system 500 or may be incorporated within processor 510 as a combination of hardware and software as known to those skilled in the art.

Program code to be loaded onto processor 510 or encoder/decoder 530 to perform the various aspects described in the present application may be stored in storage device 540 and subsequently loaded onto memory 520 for execution by processor 510. In accordance with various embodiments, one or more of processor 510, memory 520, storage device 540, and encoder/decoder module 530 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 510 and/or the encoder/decoder module 530 may be used to store instructions and to provide working memory for processing that may be performed during encoding or decoding.

In other embodiments, however, a memory external to the processing device (for example, the processing device may be either the processor 510 or the encoder/decoder module 530) may be used for one or more of these functions. The external memory may be the memory 520 and/or the storage device 540, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 500 may be provided through various input devices as indicated in block 590. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 590 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 500 to other electronic devices across USB and/or HDMI connections. It is to be understood that various aspects of input processing, for example, Reed-Solomon error correction, may be implemented, for example, within a separate input processing IC or within processor 510 as necessary. Similarly, aspects of USB or HDMI interface processing may be implemented within separate interface ICs or within processor 510 as necessary. The demodulated, error corrected, and demultiplexed stream may be provided to various processing elements, including, for example, processor 510, and encoder/decoder 530 operating in combination with the memory and storage elements to process the data stream as necessary for presentation on an output device.

Various elements of system 500 may be provided within an integrated housing. Within the integrated housing, the various elements may be interconnected and transmit data therebetween using suitable connection arrangement 590, for example, an internal bus as known in the art, including the I2C bus, wiring, and printed circuit boards.

The system 500 may include communication interface 550 that enables communication with other devices via communication channel 900. The communication interface 550 may include, but is not limited to, a transceiver configured to transmit and to receive data over communication channel 900. The communication interface 550 may include, but is not limited to, a modem or network card and the communication channel 900 may be implemented, for example, within a wired and/or a wireless medium.

Data may be streamed to the system 500, in various embodiments, using a Wi-Fi network such as IEEE 802.11. The Wi-Fi signal of these embodiments may be received over the communications channel 900 and the communications interface 550 which are adapted for Wi-Fi communications. The communications channel 900 of these embodiments may be typically connected to an access point or router that provides access to outside networks including the Internet for allowing streaming applications and other over-the-top communications.

Other embodiments may provide streamed data to the system 500 using a set-top box that delivers the data over the HDMI connection of the input block 590.

Still other embodiments may provide streamed data to the system 500 using the RF connection of the input block 590.

The streamed data may be used as a way for signaling information used by the system 500. The signaling information may comprise the bitstream B and/or information such the prediction data PD, a number of points of a point cloud, the binary data $f_0$ and $f_1$, the bits of the series of Nbits representative of the radius residual of a point of a point cloud and/or sensor setup parameters such as such as an elementary azimuthal step $\phi_{step}$ or an elevation angle $\theta_k$ associated with a sensor of the spinning sensor head 10.

It is to be appreciated that signaling may be accomplished in a variety of ways. For example, one or more syntax elements, flags, and so forth may be used to signal information to a corresponding decoder in various embodiments.

The system 500 may provide an output signal to various output devices, including a display 600, speakers 700, and other peripheral devices 800. The other peripheral devices 800 may include, in various examples of embodiments, one or more of a stand-alone DVR, a disk player, a stereo system, a lighting system, and other devices that provide a function based on the output of the system 500.

In various embodiments, control signals may be communicated between the system 500 and the display 600, speakers 700, or other peripheral devices 800 using signaling such as AV.Link (Audio/Video Link), CEC (Consumer Electronics Control), or other communications protocols that enable device-to-device control with or without user intervention.

The output devices may be communicatively coupled to system 500 via dedicated connections through respective interfaces 560, 570, and 580.

Alternatively, the output devices may be connected to system 500 using the communications channel 900 via the communications interface 550. The display 600 and speakers 700 may be integrated in a single unit with the other components of system 500 in an electronic device such as, for example, a television.

In various embodiments, the display interface 560 may include a display driver, such as, for example, a timing controller (T Con) chip.

The display 600 and speaker 700 may alternatively be separate from one or more of the other components, for example, if the RF portion of input 590 is part of a separate set-top box. In various embodiments in which the display 600 and speakers 700 may be external components, the output signal may be provided via dedicated output connections, including, for example, HDMI ports, USB ports, or COMP outputs.

In FIG. 1-12, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

Computer software may be implemented by the processor 510 or by hardware, or by a combination of hardware and software. As a non-limiting example, the embodiments may be also implemented by one or more integrated circuits. The memory 520 may be of any type appropriate to the technical environment and may be implemented using any appropriate data storage technology, such as optical memory devices, magnetic memory devices, semiconductor-based memory devices, fixed memory, and removable memory, as non-limiting examples. The processor 510 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer to entropy decoding, in another embodiment "decoding" may refer only to differential decoding, and in another embodiment "decoding" may refer to combinations of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to entropy encoding, in another embodiment "encoding" may refer only to differential encoding, and in another embodiment "encoding" may refer to combinations of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory or bitstream), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory or bitstream). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such the prediction data PD, a number of points of a point cloud, the binary data $f_0$ and $f_1$, the bits of the series of Nbits representative of the radius residual of a point of a point cloud or sensor setup parameters such as the elementary azimuthal step $\phi_{step}$ or an elevation angle $\theta_k$ associated with a sensor k. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud into a bitstream of encoded point cloud data, each point of the point cloud being associated with a radius responsive to a distance of the point from a sensor that captured the point, the method comprising:

obtaining a predicted radius representative of a prediction of a radius of a point of the point cloud from prediction data (PD);

obtaining a radius residual of a point of the point cloud between the radius of said point and the predicted radius;

selecting a context based on the prediction data (PD), wherein the prediction data (PD) comprises a predictor index that points to a predictor selected from a list of at least one predictor each comprising a predicted radius; and context-based entropy encoding the magnitude of the radius residual based on the selected context.

2. The method of claim 1, wherein the method further comprises context-based entropy encoding based on the selected context, into the bitstream, a binary data ($f_0$) indicating whether the magnitude of the radius residual equals 0 or not.

3. The method of claim 2, wherein the magnitude of the radius residual $r_{res}$ minus 1 is context-based entropy encoded based on the selected context.

4. The method of claim 1, wherein the method further comprises context-based entropy encoding, into the bitstream, a binary data (f 1) indicating whether the magnitude of the radius residual is equal to or greater than 1.

5. The method of claim 4, wherein the magnitude of the radius residual $r_{res}$ minus 2 is context-based entropy encoded based on the selected context.

6. The method of claim 1, wherein the predicted radius is obtained from the predictor selected from the list of said at least one predictor.

7. The method of claim 1, wherein each point of the point cloud being further associated with an azimuthal angle responsive to a capture angle of the sensor, a predicted azimuthal angle being obtained by adding an azimuthal angle obtained from the prediction data (PD) with an azimuthal angle shift defined as a product of an integer number (m) by an elementary azimuthal step ($\phi_{step}$) and wherein the prediction data comprises said integer number (m).

8. The method of claim 1, wherein the prediction data (PD) is encoded into the bitstream.

9. The method of claim 1, wherein a series of bits, representative of the magnitude of the radius residual, is encoded as a unary code and said unary code is context-based entropy encoded based on the selected context; or a series of bits, representative of the magnitude of the radius residual, is encoded as an Exponential-Golomb code and said Exponential-Golomb code is context-based entropy encoded based on the selected context.

10. A method of decoding a point cloud from a bitstream of encoded point cloud data, each point of the point cloud being associated with a radius responsive to a distance of the point from a sensor that captured the point, the method comprising:

obtaining a predicted radius representative of a prediction of a radius of a point of the point cloud from prediction data (PD);

selecting a context based on the prediction data (PD), wherein the prediction data (PD) comprises a predictor index that points to a predictor selected from a list of at least one predictor each comprising a predicted radius; and context-based entropy decoding the magnitude of a radius residual based on the selected context.

11. The method of claim 10, wherein the method further comprises context-based entropy decoding based on the selected context, from the bitstream, a binary data ($f_0$) indicating whether the magnitude of the radius residual equals 0 or not.

12. The method of claim 11, wherein the magnitude of the radius residual $r_{res}$ minus 1 is context-based entropy decoded based on the selected context.

13. The method of claim 10, wherein the method further comprises context-based entropy decoding from the bitstream, a binary data ($f_1$) indicating whether the magnitude of the radius residual is equal to or greater than 1.

14. The method of claim 13, wherein the magnitude of the radius residual $r_{res}$ minus 2 is context-based entropy decoded based on the selected context.

15. The method of claim 10, wherein the predicted radius is obtained from the predictor selected from the list of said at least one predictor.

16. The method of claim 10, wherein each point of the point cloud being further associated with an azimuthal angle responsive to a capture angle of the sensor, a predicted azimuthal angle being obtained by adding an azimuthal angle obtained from the prediction data (PD) with an azimuthal angle shift defined as a product of an integer number (m) by an elementary azimuthal step ($\phi_{step}$) and wherein the prediction data comprises said integer number (m).

17. The method of claim 10, wherein the prediction data (PD) is decoded from the bitstream.

18. The method of claim 10, wherein a series of bits, representative of the magnitude of the radius residual, is decoded as a unary code and said unary code is context-based entropy decoded based on the selected context; or a series of bits, representative of the magnitude of the radius residual, is decoded as an Exponential-Golomb code and said Exponential-Golomb code is context-based entropy decoded based on the selected context.

19. An apparatus comprising one or more processors configured to carry out the method claimed in claim 10.

20. An apparatus comprising one or more processors configured to carry out a method of encoding a point cloud into a bitstream of encoded point cloud data, each point of the point cloud being associated with a radius responsive to a distance of the point from a sensor that captured the point, the method comprising:

obtaining a predicted radius representative of a prediction of a radius of a point of the point cloud from prediction data (PD);

obtaining a radius residual of a point of the point cloud between the radius of said point and the predicted radius;

selecting a context based on the prediction data (PD), wherein the prediction data (PD) comprises a predictor index that points to a predictor selected from a list of at least one predictor each comprising a predicted radius; and context-based entropy encoding the magnitude of the radius residual based on the selected context.

* * * * *